H. T. HERR.
INTERNAL COMBUSTION ENGINE.
APPLICATION FILED AUG. 28, 1912.

1,197,121. Patented Sept. 5, 1916.
7 SHEETS—SHEET 1.

Fig. 1.

WITNESSES.

INVENTOR.
Herbert T. Herr

HIS ATTORNEY IN FACT

H. T. HERR.
INTERNAL COMBUSTION ENGINE.
APPLICATION FILED AUG. 28, 1912.

1,197,121.

Patented Sept. 5, 1916.
7 SHEETS—SHEET 5.

WITNESSES:

INVENTOR.
Herbert T. Herr.
BY
HIS ATTORNEY IN FACT.

UNITED STATES PATENT OFFICE.

HERBERT T. HERR, OF PITTSBURGH, PENNSYLVANIA, ASSIGNOR TO THE WESTING-HOUSE MACHINE COMPANY, A CORPORATION OF PENNSYLVANIA.

INTERNAL-COMBUSTION ENGINE.

1,197,121. Specification of Letters Patent. Patented Sept. 5, 1916.

Application filed August 28, 1912. Serial No. 717,509.

*To all whom it may concern:*

Be it known that I, HERBERT T. HERR, a citizen of the United States, and a resident of Pittsburgh, in the county of Allegheny and State of Pennsylvania, have made a new and useful Invention in Internal-Combustion Engines, of which the following is a specification.

This invention relates to internal combustion engines and more particularly to new and useful improvements in valves and valve gears, starting devices, as well as to improvements in lubricating and cooling systems for engines of this type.

An object has been to produce a simple, efficient, quiet-running engine capable of being easily started and one especially adapted for motor vehicle work. This, as well as other objects which will readily appear to those skilled in this art, I attain in the engine described in the specification and illustrated in the drawings accompanying the same and forming a part of this application.

In the drawings, throughout which like parts are denoted by like characters.

For the sake of illustrating this invention, but with no idea of limiting it, a four-cylinder, four-cycle automobile type of engine has been chosen. The engine is of the rotary valve type and has a single rotary plug valve driven from one end through suitable gearing from the engine shaft. The four cylinders can be cast *en bloc* and bolted to the crank case which is provided with a false bottom and well for effecting splash lubrication with a constant oil level. The rotary valve is here shown as driven at one-quarter the engine speed and is so ported as to control both the inlet and exhaust passages which are located on opposite sides of the valve chamber. The single valve which is common to all four cylinders is made hollow and the passage therethrough is coupled up to the oiling system so that oil is continuously forced through the valve and not only keeps the same cool, but by means of suitable holes drilled from the inside of the valve through to its bearing surfaces, the valve lubrication is effected.

By utilizing the valve itself as the distributer for charging the reservoir and for charging the cylinders from the reservoir, spring-loaded check valves, now commonly used in such systems, are not needed and consequently the full gas pressure in the cylinders is available for the reservoir.

The valve passes centrally along the tops of the four cylinders and is amply water-jacketed. The valve is driven from the engine shaft by means of a vertical shaft through helical gears and the water and oil pumps as well as the magneto are driven from this vertical shaft. The vertical shaft as well as the gears therefor are inclosed in a housing and the oil which is fed into one end of the rotary valve passes out the other end and flows down through the housing thus lubricating the shaft bearings as well as the gears.

Included in the oiling system is a governing device which comprises a motor, spring-pressed in one direction and moved in the opposite direction by means of the oil pressure in the oiling system. The only outlet to this motor is controlled by means of a manually operated valve and the motor stem is connected to the throttle valve of the carbureter. The system is so arranged that the greater the speed of the engine, the more oil will flow through the valve for cooling and for lubricating the same; in other words, the amount of oil flowing through the valve for cooling and lubrication depends absolutely upon the speed of the engine and the speed of the engine is controlled by an automatic device capable of manual variation.

*Cylinders.*—As before stated, the four cylinders can be cast *en bloc* and the cylinder casting is longitudinally bored at 19 to form a valve chamber to receive valve 20 and rectangular ports 21 lead from each cylinder to the valve chamber. Inlet ports 22 for each cylinder lead into the valve chamber at right angles to ports 21 and exhaust ports 23 lead into the valve chamber at points diametrically opposite inlet ports 22. Inlet manifold 24 is bolted to the cylinder casting on one side while exhaust manifold 25 is bolted to the cylinder casting on the opposite side.

*Pistons.*—The pistons 28 are of the usual construction and are connected to crank shaft 29 by the usual type of connecting rods 30.

*Crank case.*—The crank case is formed in two parts, the upper of which is bolted to the cylinder casting at 31. The crank case floor or bottom 32 is bolted to the crank case at 33 so that the floor or bottom may be removed and access had to the crank shaft and connecting rods. The crank shaft 29 is of the two-bearing type and is journaled in suitable ball bearings 34 and 35 mounted in the ends of the crank case. The crank shaft at one end carries a fly-wheel 36 and at the other is provided with a cranking connection, not shown, for use in cases of emergency. The cylinder floor or bottom is of more or less peculiar construction and consists of a box-like well for the overflow oil from the crank case and in this well cooling coils for the oiling system are located. Through these cooling coils the water from the radiator is circulated in order that the oil which passes through the valve may be kept at a desirable temperature.

Figure 10:
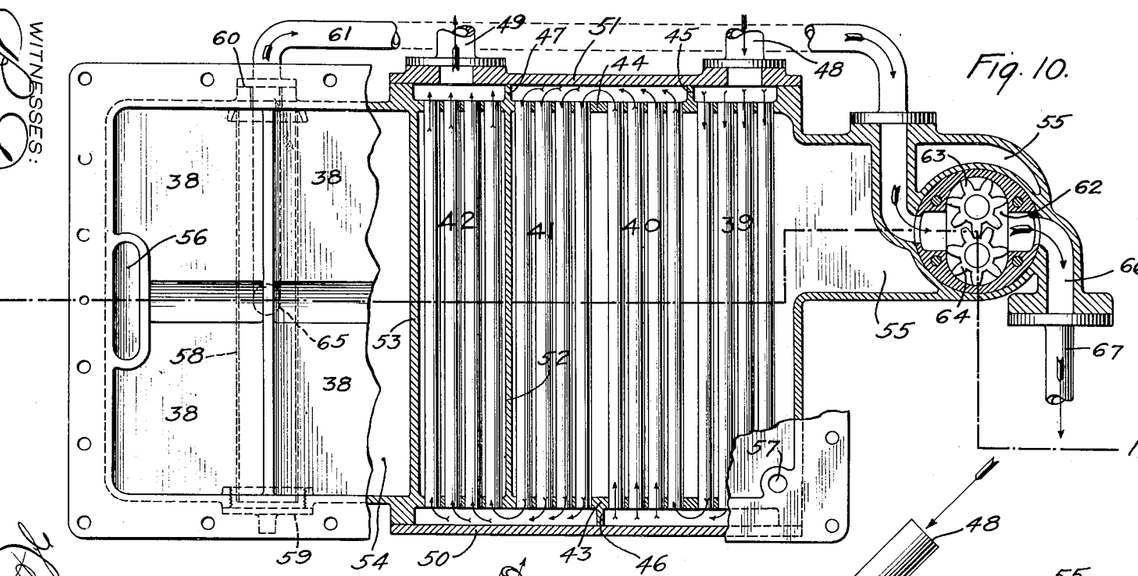
Fig. 10 is a view partially in plan and partially in section of the bottom or well of the crank case.
Figure 11:
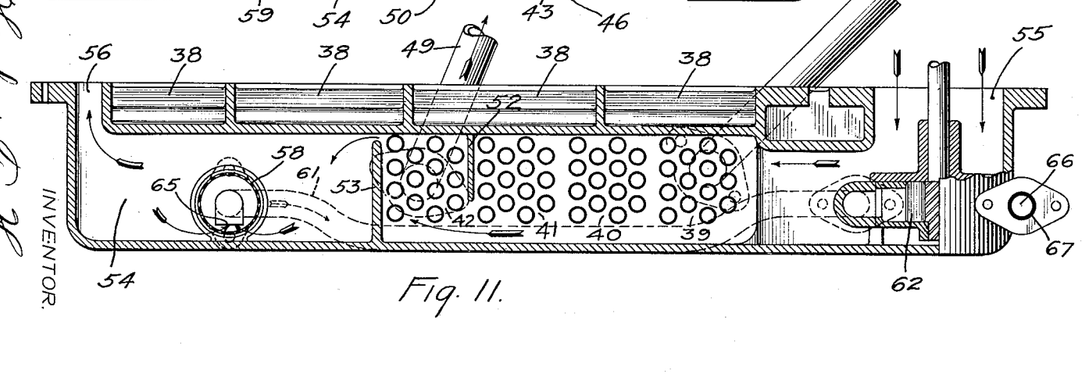
Fig. 11 is a view in sectional elevation on line 11—11 of the bottom or well of the crank case.

The crank case bottom is provided with four trays 38 for containing oil, into which the connecting rods of the engine dip for the purpose of effecting splash lubrication. The box-like well beneath these trays contains an oil cooler composed of four banks of coils or tubes 39, 40, 41, and 42 included in the water-circulating system with the radiator. These tubes are secured in end plates 43 and 44, and partitions 45, 46, and 47 are provided so that the water entering the cooler first flows through tubes 39, then through tubes 40, then through tubes 41, and upon leaving the cooler flows out through tubes 42, the inlet 48 being connected to the radiator and the outlet 49 to the water-circulating pump. The oil cooler is provided with removable end plates 50 and 51 which may be removed for the purpose of cleaning out the tubes. The cooler is shown as having a downwardly extending baffle plate 52 to insure proper circulation of oil and to prevent a short circuit of the hot oil across the top of the cooler. The end 53 of the cooler is made in the nature of a dam over which the cooled oil will flow into the chamber 54 of the well or bottom. The oil flows into the well or bottom through inlet 55 from the rotary valve and a portion of the cooled oil within chamber 54 passes through outlet 56 to supply the necessary amount for the crank case and the crank trays 38. The surplus in the trays flows back into the cooler through overflow orifice 57. The oil for the circulating system from chamber 54 passes through a strainer 58 located within chamber 54 and formed in the nature of a cylinder closed at the ends by caps 59 and 60. The intake pipe 61 for the oil circulating pump 62 which is of the gear type employing gears 63 and 64 has the inlet end of its intake pipe 61 at 65 at about the center of the strainer 58. The outlet 66 of circulating pump 62 connects by means of a pipe 67 with a governing device to be hereinafter described.

Figure 1:
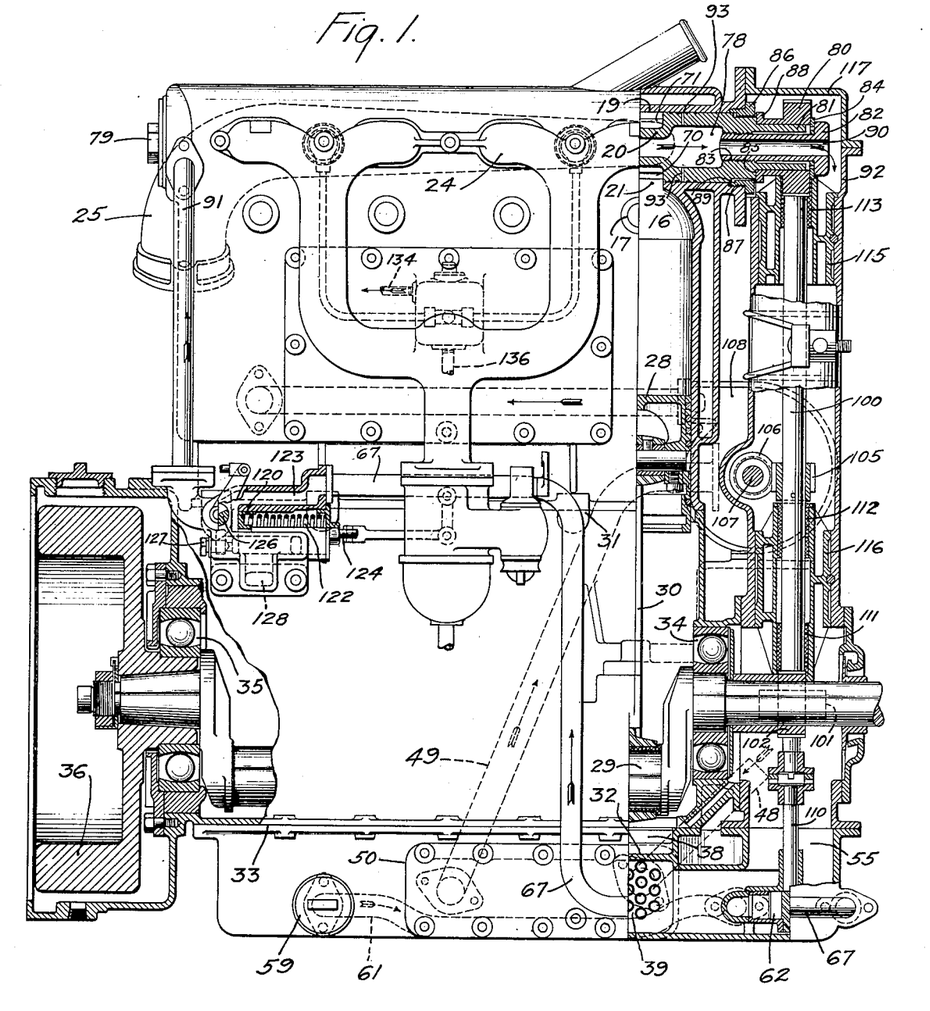
Figure 1 is a view partly in section and partly in elevation of an engine embodying this invention.
Figure 2:
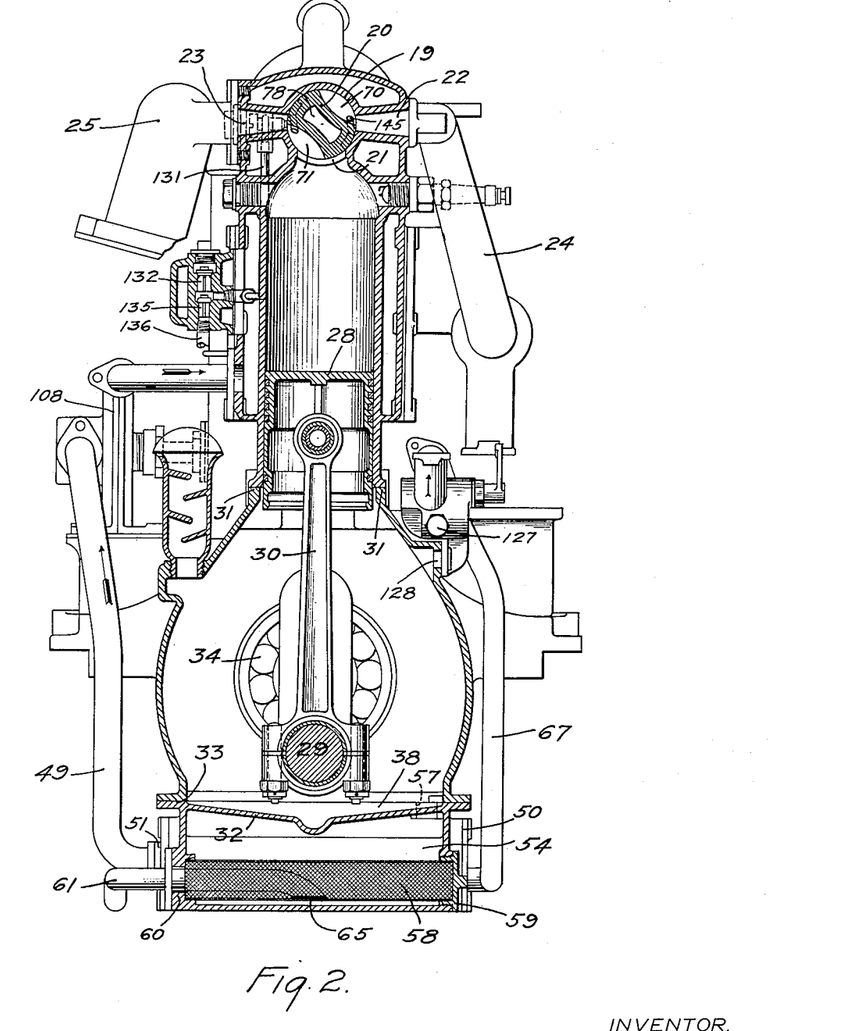
Fig. 2 is an end sectional elevation of the same.
Figure 3:
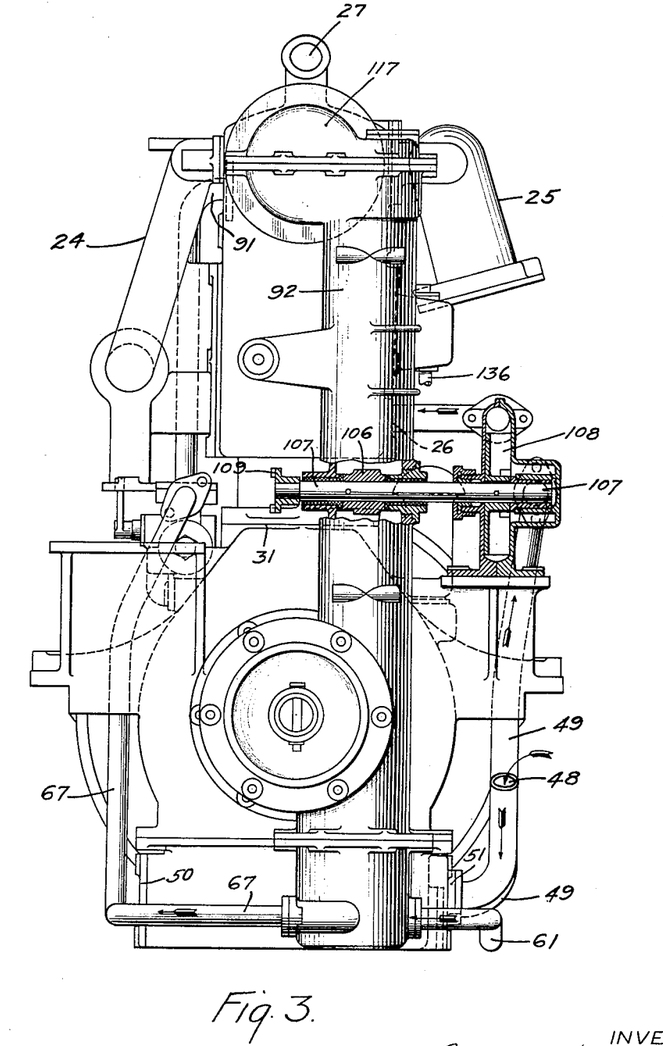
Fig. 3 is an end view in elevation.
Figure 4:
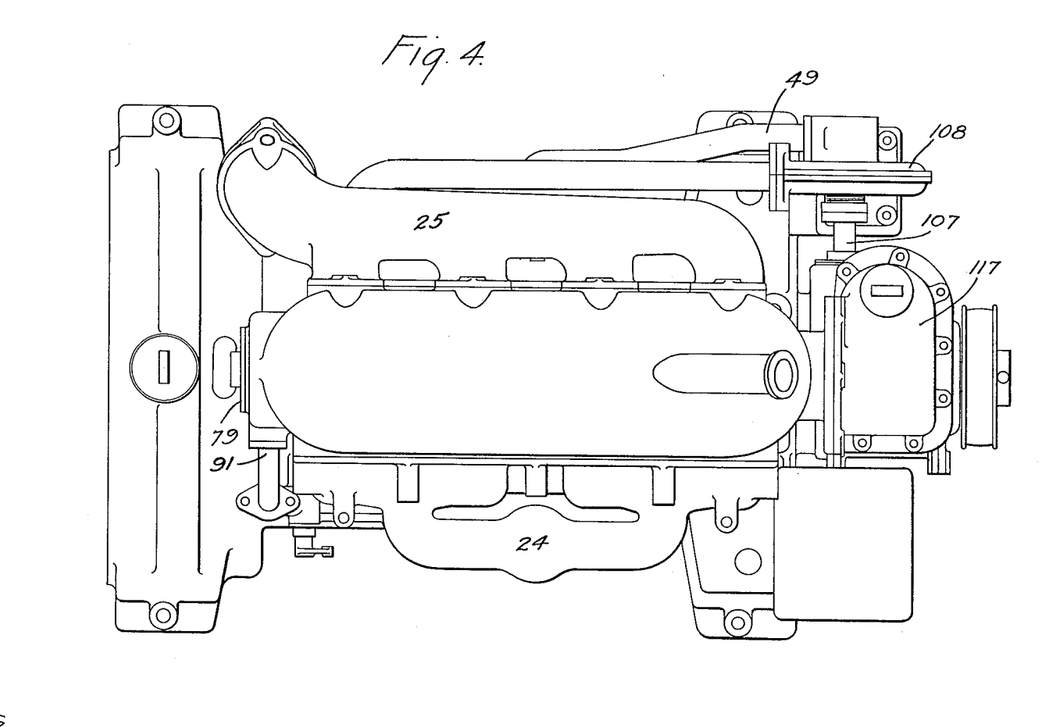
Fig. 4 is a plan view.
Figure 5:
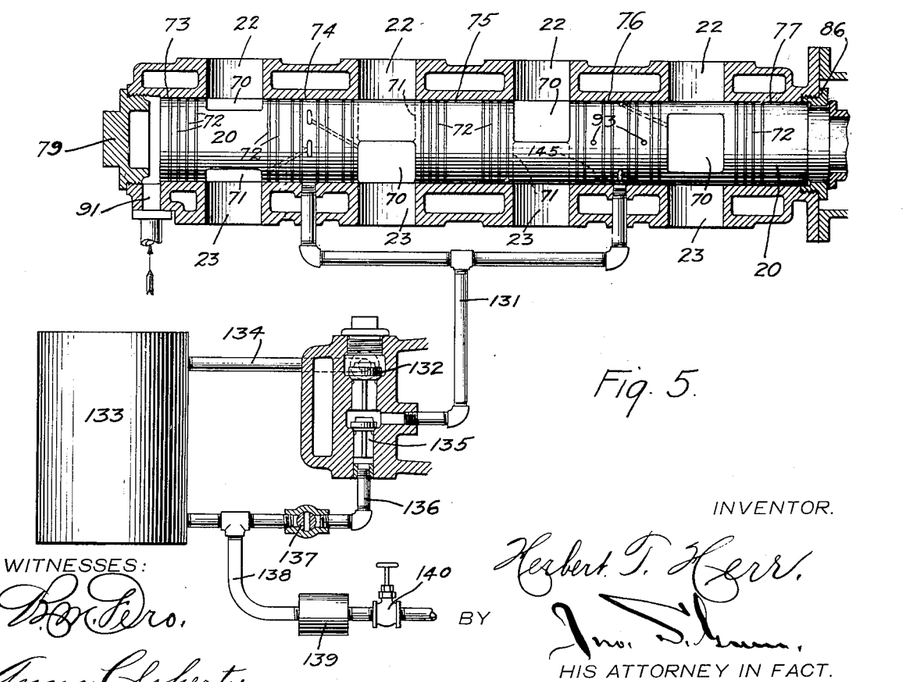
Fig. 5 is a detail view of the valve utilized with this engine and of the starting device diagrammatically illustrated.
Figure 6:
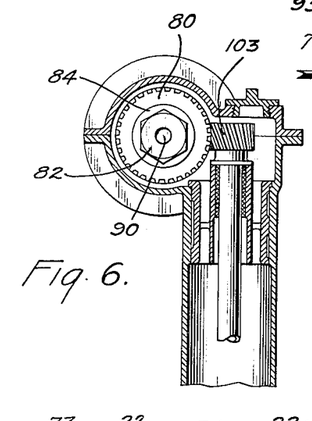
Fig. 6 is a detail view of a portion of the valve gear.

*Rotary valve.*—The rotary valve which is formed in one piece is shown as containing a double set of valves for each cylinder, the one here illustrated being designed to be driven at one-quarter the engine speed, each valve serving in its turn as inlet and exhaust valve. The valve 20 is of the plug type and made straight from end to end so as to snugly fit within the straight bore 19 and is provided, in line with the inlet and exhaust ports of each cylinder, with ports 70 and 71. These ports are formed so as to give the maximum port opening for both inlet and exhaust. Between the ports the valve is provided with oil grooves 72 which come in line with the valve seats 73, 74, 75, 76 and 77 and effectively serve to prevent the escape of oil from the seats to the cylinders through the ports, as well as to prevent the escape of gases from the cylinders to the next adjacent cylinders.

Figure 9:
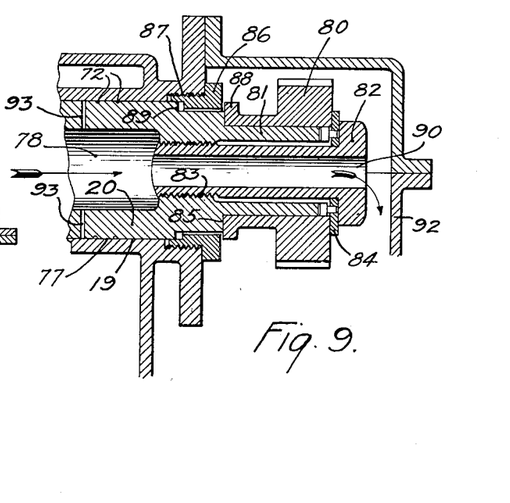
Fig. 9 is a detail view in section of the driving end of the rotary valve.

The valve is provided with a cored passage 78, which extends through it from end to end and which passage is included in the oil circulating system. One end of the valve bore is closed by a cap 79 and the other end by a housing cap for the valve drive. A gear 80 is secured upon a reduced portion 81 of the valve by means of a screw 82 threaded into the valve at 83 and which forces gear 80 by means of a washer 84 against the shoulder 85; this construction allows for adjusting the valve. Excessive end play of the valve is prevented by suitable means, as for example, a nut 86, which is screwed into the cylinder casting at 87 and which lies between the inner enlarged end 88 of gear 80 and a shoulder 89 formed on the valve. Screw 82 is provided with an oil passage 90 which extends therethrough and permits the oil which enters the valve through oil inlet 91 to flow through the valve and out through passage 90 into a housing 92 which conducts it to inlet 55 of the crank case well.

Between the oil groves in the valve a suitable number of small holes 93 are drilled through the valve, and through these holes oil from the interior of the valve passes out to the valve seats, thereby effecting the lubrication of the valve.

*Valve drive.*—The rotary valve is driven by suitable means, here shown as a vertical shaft 100 which carries a spiral gear 101 meshing with spiral gear 102 on the engine shaft. The gears 101 and 102 have a ratio of 1 to 1. A spiral gear 103 on the vertical shaft 100 meshes with gear 80 with a ratio of 1 to 4. A spiral gear 105 carried by the vertical shaft meshes with gear 106 on shaft 107 which drives the water-circulating pump 108 and is provided with a coupling 109 for the ignition magneto. The vertical shaft is coupled to the shaft 110 of oil-circulating pump 62 by means of a coupling. The vertical shaft 100 rotates within bearings 111, 112 and 113 secured in place in a housing 92 by means of webbed bracket-like bushings 115 and 116. The housing 92 is provided with a cover 117 and serves to conduct the oil escaping from the rotary valve to the inlet 55 of the crank case bottom.

Figures 7, 8:
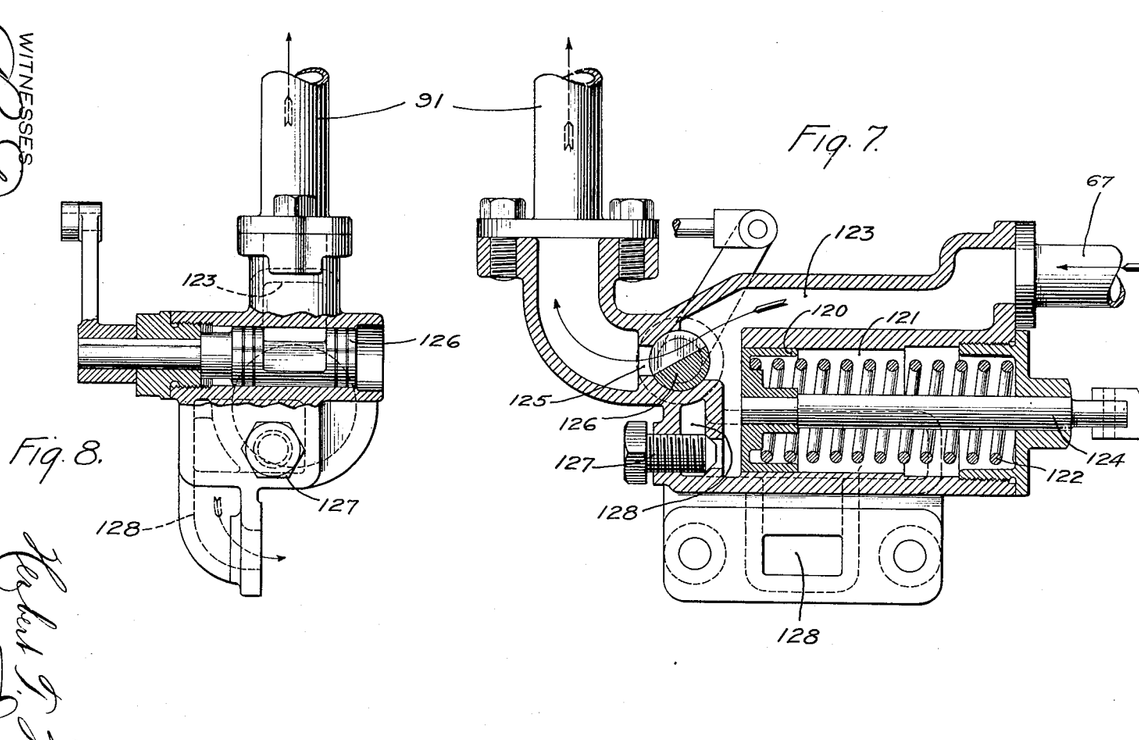
Figs. 7 and 8 are detail views of the governing device utilized by this engine.

*Governor.*—The engine is provided with a governing device which automatically cares for the throttle of the engine carbureter and also automatically cuts down and increases the supply of oil to the rotary valve in accordance with the engine speed. This governor is located in the oil-circulating system and consists of a motor device having a piston 120 reciprocable within a cylinder 121 and spring moved in one direction by a spring 122 and in the opposite direction by the oil pressure within chamber 123 which is in open communication, by means of pipe 67, with the outlet of the oil-circulating pump 62. Piston 120 is provided with a piston rod 124 the outer end of which is adapted to be connected to the carbureter throttle valve lever. The outlet 125 to chamber 123 is controlled by means of a rotary plug valve 126 and the outlet 125 connects with inlet 91 of the rotary valve chamber.

It will be seen that by means of this construction the amount of oil supplied to the rotary valve chamber will not only be dependent upon the speed of the circulating pump 62 but will also be dependent upon the position of valve 126 which valve will be under the control of the operator of the engine or the driver of the automobile through suitable links and levers connecting said valve with either the hand control on the steering-column of the automobile or with the foot accelerator.

The carbureter throttle valve lever may be connected to valve stem 124 in such a manner that as piston 120 moves against the stress of spring 122 the throttle will be closed more or less and this will happen as the oil pressure within chamber 123 piles up or increases due to the constriction of outlet 125 by the valve 126. In order to drain the system a plug 127 is provided, and by unscrewing this plug, free communication between chamber 123 and the crank case of the engine is obtained through chamber 128 which opens into the crank case.

In accordance with the provisions of the patent statutes I have described the principle of operation of my invention together with the device which I now consider to represent the best embodiment thereof, but I desire to have it understood that the device shown is only illustrative and that the invention can be carried out in other ways.

Having thus described my invention what I claim is:

1. In an internal combustion engine provided with inlet and exhaust ports, a rotary valve serving to control said ports and provided with a passage therethrough from end to end, driving means for said valve, and means for forcing oil through the passage in said valve and over said driving means.

2. In an internal combustion engine, provided with inlet and exhaust ports, a rotary valve controlling said ports and provided with a passage therethrough from end to end for a flow of cooling oil, an oil cooler located within the engine housing, and means for circulating oil through said cooler and said valve.

3. In an internal combustion engine, provided with inlet and exhaust ports, a rotary valve controlling said ports having a passage extending axially therethrough, for a flow of cooling liquid, an adjustable thrust bearing at one end of said valve, a housing forming a part of the engine frame inclosing the inlet end of the passage through the valve, a gear for rotating the valve mounted on the valve intermediate the ends of said passage, and means for rigidly locking said gear on said valve and having a liquid passage formed therein which communicates with the passage of the valve.

4. In an internal combustion engine provided with inlet and exhaust ports, an open-ended tubular valve formed so as to coöperate with said ports for controlling the inlet of gas to said engine and the exhaust therefrom, a gear-driving mechanism for said valve operatively connected to one end of said valve, an oil conduit leading to the other end of said valve, and means for forcing oil through said conduit, through said valve and over said mechanism.

5. In an internal combustion engine provided with inlet and exhaust ports, a rotary valve controlling said ports and provided with a passage therethrough from end to end for the flow of oil, an oil cooler, means for circulating cooling water through said oil cooler, and means for forcing oil through said cooler and said valve.

6. In an internal combustion engine having cylinders provided with inlet and exhaust ports, a hollow cylindrical valve controlling said ports and having its axis perpendicular to the axis of the engine cylinders, means for rotating said valve, and mechanism for causing oil to flow lengthwise through said valve and to spill over said means.

7. In a multi-cylinder internal combustion engine, cylinders provided with inlet and exhaust ports, an open-ended tubular valve formed so as to control all of said ports, a crank shaft for said engine, a drive shaft, and gears between said crank shaft and one end of said valve, an oil pump and conduit means for leading oil delivered by said pump through said valve to the opposite end of said valve from said gears.

8. In an internal combustion engine having a cylinder provided with inlet and exhaust ports, an open-ended tubular valve formed so as to coöperate with said ports for controlling the same, a crank shaft for said engine, a rotating drive shaft between said crank shaft and said valve, gears connecting said crank shaft and said valve to said drive shaft, a casing surrounding said drive shaft, conduit means leading to one end of said valve, and an oil pump for forcing oil through said conduit means, said valve and said casing.

9. In an internal combustion engine, a valve for the cylinder of the engine having a passage formed therein for cooling liquid; a pump for circulating liquid through the valve, and a shaft for actuating said valve and for driving said pump, located within a passage of the cooling liquid circulatory system.

10. In an internal combustion engine, a valve for the cylinder of the engine having a passage extending therethrough for circulating cooling liquid, a pump for delivering cooling liquid to said valve, and a shaft driven from the engine shaft for actuating said pump and said valve, said shaft being located in a passage of the cooling liquid circulating system.

11. In combination in an internal combustion engine, a valve for the engine cylinder having a passage formed therein for cooling liquid, a cooling liquid circulating system including the passage of said valve, a liquid circulating pump for forcing cooling liquid through said system, and means driven by the shaft of the engine for actuating said valve and for driving said pump, said means being located in a passage of the liquid circulating system.

12. In combination in an internal combustion engine, a valve for the cylinder of the engine having a passage for cooling liquid formed therein, a liquid cooler communicating with the passage of the valve, a pump for circulating cooling water through the cooler, a pump for forcing cooling liquid through the cooler and through the passage in the valve, and a single shaft for actuating both of said pumps and said valve.

13. In combination in an internal combustion engine, a valve for the cylinder of the engine having a passage for cooling liquid extending therethrough; a cooler for the cooling liquid communicating with one end of the passage in the valve, a pump communicating with the other end of the valve for forcing cooling liquid through the cooler and through the valve, a pump for circulating cooling water through the cooler, and a shaft over which cooling liquid circulated by said pump flows, for actuating both of the pumps and the valve.

14. In combination in an internal combustion engine, a valve for controlling the discharge of the products of combustion from the engine cylinder and having a passage for cooling liquid formed therein, an inclosed circulating system for cooling liquid including the passage in the valve, a pump driven by the engine at a speed directly proportional to the speed of the engine for circulating cooling liquid through the system, and a governing device responsive to variations of liquid pressure within said inclosed system.

15. In combination in an internal combustion engine, a valve for the cylinder of the engine having a passage for cooling liquid formed therein, an inclosed system for circulating cooling liquid communicating with said passage, a pump driven by the engine, and at a speed directly proportional to the speed of the engine, for circulating cooling liquid through said system and said passage, a manually controllable valve located in said system for checking the flow of liquid there through, and a governing device located in said system between the delivery ports of the pump and said valve, and responsive to variations of liquid pressure within said system.

16. In combination in an internal combustion engine, a valve for controlling the engine ports having a passage for cooling liquid formed therein, an inclosed system including the passage in the valve for circulating cooling liquid, a pump driven by the engine at a speed proportional to the speed of the engine for circulating cooling liquid through the system, and a governing device responsive to variations in the pressure of the liquid in said system for controlling the operation of the engine.

In testimony whereof I have hereunto subscribed my name this 26th day of August, 1912.

HERBERT T. HERR.

Witnesses:
CHARLES W. McGHEE,
B. F. FUNK.